US005245315A

United States Patent [19]

Johlnson et al.

[11] Patent Number: 5,245,315

[45] Date of Patent: Sep. 14, 1993

[54] FIBER OPTIC ESCALATOR HANDRAIL INTRUSION DETECTOR SHIELD

[75] Inventors: Gerald E. Johlnson, Farmington; Vlad Zaharia, Rocky Hill, both of Conn.

[73] Assignee: Otis Elevator Company, Farmington, Conn.

[21] Appl. No.: 941,820

[22] Filed: Sep. 8, 1992

[51] Int. Cl.[5] .......................... G08B 13/00; B65G 15/00

[52] U.S. Cl. .......................... 340/541; 198/323; 340/555

[58] Field of Search .......................... 340/541, 568, 555–557, 340/676, 679; 250/221, 222.1, 223 R; 198/338, 323, 502.1; 385/12–13; 361/170, 173–175

[56] References Cited

U.S. PATENT DOCUMENTS

| | | | |
|---|---|---|---|
| 2,846,045 | 8/1958 | Fowler | 198/338 X |
| 2,848,093 | 8/1958 | Van Etten | 198/338 X |
| 3,934,699 | 1/1976 | Saito et al. | 198/338 X |
| 4,249,074 | 2/1981 | Zettler et al. | 340/556 X |
| 4,379,289 | 4/1983 | Peek | 340/555 |
| 4,546,345 | 10/1985 | Naito | 340/555 X |
| 4,619,355 | 10/1986 | Adrian et al. | 198/323 |
| 4,924,995 | 5/1990 | Adrian et al. | 198/323 |
| 4,976,345 | 12/1990 | Adrian et al. | 198/323 |
| 5,001,459 | 3/1991 | Jacoby et al. | 340/568 |

FOREIGN PATENT DOCUMENTS

| | | | |
|---|---|---|---|
| 95096 | 4/1991 | Japan | 198/323 |

*Primary Examiner*—Thomas Mullen
*Attorney, Agent, or Firm*—Richard D. Getz

[57] ABSTRACT

An optical fiber (28) disposed at the entry edge (32) of an escalator handrail guard (22) receives light from an LED (38), the magnitude of which is sensed by a detector (40), the output of which is compared (48) to determine whether its magnitude is sufficient to indicate the lack of intrusion of objects into the guard (22); if not a relay (56, 58) will drop power to the motor (62).

2 Claims, 1 Drawing Sheet

FIBER OPTIC ESCALATOR HANDRAIL INTRUSION DETECTOR SHIELD

TECHNICAL FIELD

This invention relates to detecting the intrusion of objects into the point where an escalator handrail reenters the balustrade near the passenger exit newel.

BACKGROUND ART

The age-old problem of discouraging passengers from inserting objects into the reentry passage of an escalator handrail, and of avoiding injury to feet and hands which can be dragged into the entry by the motion of the handrail still persists. In the beginning, a simple plate with a slotted oval opening (sort of tee shaped) prevented objects and debris from entering the balustrades. However, the clearance required to avoid scratching of the visible top-surface portion of the handrail also provided the opportunity for injury to mall fingers and the like. Therefore, other types of guards were provided to the handrail reentry. A sponge rubber guard is illustrated in U.S. Pat. No. 2,708,997. But the resilience of such a guard allows small hands and arms (etc.) to be drawn significantly into the balustrade by friction with the moving handrail, thus causing different types of injuries. A flexible guard placed in front of a more solid guard is illustrated in U.S. Pat. No. 3,670,862. To avoid ingestion type injuries U.S. Pat. No. 3,970,187 provides a very close guard of foamed polystyrene which is adapted to crumble under pressure, such as the pressure imposed by a hand.

A different approach is to detect the intrusion of objects and sound alarms or shut the handrail down. An early intrusion detector is a microswitch having an actuator mounted in the path of an intruding object within the balustrade, as shown in U.S. Pat. No. 2,846,045. A variation therein is a hollow, pneumatically sealed guard connected to a pressure switch, such that any deflection thereof from an intruding object will raise the pneumatic pressure and operate the switch to shut down the handrail, disclosed in U.S. Pat. No. 2,848,093. However, the handrails have significant mass and do not stop immediately. Thus detecting the intrusion, after it has occurred, will generally not stop the handrail quickly enough to avoid injury, even injury caused by contacting the intrusion detector itself. Therefore, non-injurious detectors have been proposed, such as an electrostatic field intrusion detector illustrated in U.S. Pat. No. 5,001,495.

A further approach, in U.S. Pat. No. 5,001,459, has a guard that generally keeps debris and foreign objects out, but utilizes an intrusion sensor to physically open the guard when intrusion occurs, thereby tending to mitigate injury. However, these still have the problem of sufficiently rapid operation to avoid injuring intruding body parts on the one hand and keeping out unwanted debris and inserted objects on the other.

Still another approach includes having a very closely fitting guard which avoids gauging the handrail by being allowed to move somewhat therewith, one form of which is shown in U.S. Pat. No. 5,064,047.

DISCLOSURE OF INVENTION

Objects of the invention include provision of an escalator handrail reentry guard which, without damaging the handrail, will keep out debris and unwanted objects, but will detect intrusions with sufficient sensitivity to shut off the handrail before injury occurs, and without injury from the detector itself.

This invention is predicated on our notion that escalator handrail entry guards which are physically simple and inexpensive must nonetheless provide a close, nondamaging fit to the handrail as well as rapid, non-injurious detection of intrusion into the balustrade. The invention is predicated on our discovery that even the slightest pressure applied to an optical fiber will reduce the quantity of light passing therethrough sufficiently to permit reliable detection thereof.

According to the present invention, an escalator handrail entry guard has an optical fiber disposed adjacent the handrail-contacting surface near the entry edge thereof, reduction of light passing through the fiber optic causing deenergization of handrail motor circuits, thereby to stop the handrail motion.

The invention is readily implemented in a variety of forms suited to various escalator design requirements, utilizing techniques and apparatus which are readily available in the art in the light of the teachings which follow hereinafter.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
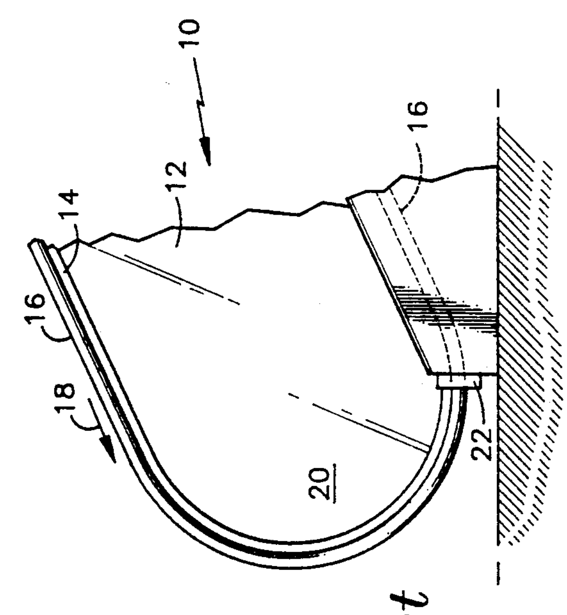
fig.1 prior art
FIG. 1 is a simplified side elevation view of an escalator balustrade and handrail of the type known in the art.

Referring now to FIG. 1, an escalator 10 includes a balustrade 12 having a guide 14 for a moving handrail 16. As shown by an arrow 18, it is assumed that the escalator 10 is being operated as a down-direction escalator such that the handrail 16 will change direction at the passenger exit newel 20 of the escalator and reenter the balustrade 12 through a guard 22. The illustration of FIG. 1 is typical of the prior art.

Figure 2:
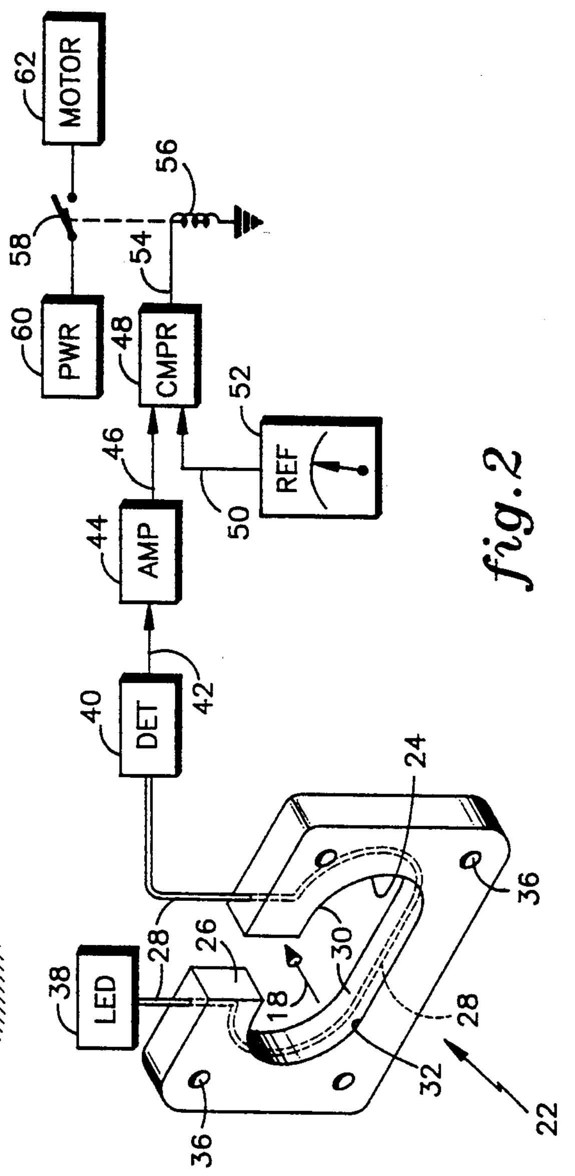
FIG. 2 is a perspective view of an escalator entry guard together with a simplified block diagram of circuitry utilized therewith, in accordance with the present invention.

In FIG. 2, the guard 22 is shown as being generally C-shaped having a generally oval opening 24 that conforms to the shape of the handrail, and a slot 26 to permit passage of the newel wheel therethrough. The guard 22 has an optical fiber 28 disposed therein just below the handrail contacting surface 30 thereof near the entry edge 32 of the guard 22. The optical fiber 28 may be any suitable fiber, such as Ornes optical fibers provided by Bridgestone Corp. of Tokyo, Japan. The characteristics of the optical fiber are not all that critical, but it is believed that optical fibers of refractive silicone rubber material with a cross section of 3 mm work best. The guard 22 is formed of a suitable elastomeric material having sufficient thickness (right to left as seen in FIG. 2) to give it sufficient durability so that intrusion will cause pressure on the optical fiber 24, rather than deformation of the guard 22. The guard 22 may comprise any thermoplastic material having suitable semi-rigid characteristics, but preferably may comprise polyurethane. The guard 22 may have suitable holes 36 therein to facilitate mounting to the balustrade 12. Of course, the guard 22 may have flanges and suitable auxiliary pieces to facilitate mounting it in any suited fashion to a wide variety of balustrade arrangements.

The optical fiber 28 is fed light from a light emitting diode (LED) 38, and the light is detected by a suitable optical detector 40 such as a photodiode. The presence of light causes the detector 40 to provide a signal on a line 42, the amplitude of which is a function of the quantity of light (amplitude) detected thereby. This signal can be provided to a suitable amplifier 44, to provide an output signal on a line 46 to a comparator 48 The other input to the comparator 48 on a line 50 is from a suitable voltage reference 52, which may be adjustable, thereby permitting adjustment of the sensitivity of the handrail obtrusion detector. So long as the signal on the line 46 is greater than the signal on the line 50, the "greater than" output of the comparator 48 will provide a signal on the line 54 to energize a relay 56, a normally open contact of which 58 transmits power from a source 60 to the escalator motor 62. However, should pressure on the optical fiber 28 cause a reduction in the amount of light transferred from the LED 38 to the detector 40, the output of the amplifier on the line 46 will fall below the reference voltage on the line 50, whereby the "greater than" signal on the line 54 will disappear, the relay 56 will become deenergized, and the contact 58 will open, causing the escalator handrail motor 62 to stop.

Advantages of the present invention include its ability to be readily made at low cost, with straightforward electronics. Another advantage is the very slight pressure at the surface is all that is required in order to provide the indication of intrusion. The invention is relatively immune to damage from the insertion of small objects, because the operative device (the optical fiber) is non-mechanical in nature, is safely embedded out of harms way and there are no moving parts to be disrupted. While the insertion of an object might trip the circuit and cause the motor to shut down, the usual objects (pencils, toys and fingers) would normally not damage the guard 22 in any way.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. An escalator balustrade handrail entry guard comprising:
   a block of elastomeric material adapted to be fastened to the passenger exit newel of an escalator including interior portions shaped to receive the handrail of the escalator and the escalator newel wheel with an optical fiber encased within said elastomeric material beneath the handrail-contacting surface of said block near the handrail entering edge thereof.

2. A balustrade handrail entry guard intrusion detector for a motor-driven escalator, comprising:
   an optical fiber disposed in the escalator passenger exit newel in a position adjacent to substantially the entire exterior surface of the escalator handrail at the point of entry of the handrail to the escalator balustrade;
   a light source transmitting light into one end of said optical fiber;
   an optical detector responsive to light emanating from a second end of said optical fiber and providing an electrical signal indicative of the amount of light detected thereby; and
   motor circuitry responsive to said electrical signal indicating a threshold amount of light being received by said optical detector for allowing the application of electrical power to the escalator motor, and operative in response to said electrical signal indicating receipt by said optical detector of an amount of light below said threshold amount for blocking the application of electrical power to said escalator motor.

* * * * *

UNITED STATES PATENT AND TRADEMARK OFFICE
CERTIFICATE OF CORRECTION

PATENT NO. : 5,245,315

DATED : Sept. 14, 1993

INVENTOR(S) : Johnson, et al.

It is certified that error appears in the above-identified patent and that said Letters Patent is hereby corrected as shown below:

On the title page, Item [19] "JohInson" should be --Johnson-- and in item [75] "Gerald E. Johlnson" should be--Gerald E. Johnson--.

Signed and Sealed this

Twelfth Day of July, 1994

Attest:

Bruce Lehman

BRUCE LEHMAN

*Attesting Officer* *Commissioner of Patents and Trademarks*